United States Patent
Popescu et al.

(10) Patent No.: US 10,132,609 B2
(45) Date of Patent: Nov. 20, 2018

(54) GRADIENT LIGHT INTERFERENCE MICROSCOPY FOR 3D IMAGING OF UNLABELED SPECIMENS

(71) Applicant: The Board of Trustees of the University of Illinois, Urbana, IL (US)

(72) Inventors: Gabriel Popescu, Champaign, IL (US); Mikhail Eugene Kandel, Champaign, IL (US); Tan Huu Nguyen, Quincy, MA (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 15/813,951

(22) Filed: Nov. 15, 2017

(65) Prior Publication Data

US 2018/0143001 A1    May 24, 2018

Related U.S. Application Data

(60) Provisional application No. 62/425,268, filed on Nov. 22, 2016.

(51) Int. Cl.
| | |
|---|---|
| *G01B 9/02* | (2006.01) |
| *G01B 11/24* | (2006.01) |
| *G01B 9/04* | (2006.01) |

(52) U.S. Cl.
CPC .......... *G01B 9/02041* (2013.01); *G01B 9/04* (2013.01); *G01B 11/24* (2013.01); *G01B 11/2441* (2013.01)

(58) Field of Classification Search
CPC ... G01J 9/02; G01B 9/02041; G01B 9/02087; G01B 9/04
See application file for complete search history.

(56) References Cited

U.S. PATENT DOCUMENTS

| | | | | |
|---|---|---|---|---|
| 7,990,543 | B1 * | 8/2011 | Mello | G01B 11/2441 356/512 |
| 2009/0276188 | A1 * | 11/2009 | Cui | G01J 9/02 702/189 |
| 2016/0259158 | A1 * | 9/2016 | Girshovitz | G01J 9/0215 |

OTHER PUBLICATIONS

Gogswell et al., "Quantitative DIC microscopy using a geometric phase shifter", Proc. SPIE 2984, Three-Dimensional Microscopy: Image Acquisition and Processing IV, pp. 72-82, (1997).

(Continued)

*Primary Examiner* — Jonathan Hansen
(74) *Attorney, Agent, or Firm* — Sunstein Kann Murphy & Timbers LLP

(57) ABSTRACT

A system and methods for quantitative optical phase imaging of a sample. First second replica field of an image field are generated, characterized by a respective optical phase, cross-polarized and shifted in a shift direction transverse to a normal to the surface of the sample. The replica fields are Fourier transformed, the second replica field is retarded by four successive phase shifts, and, after inverse Fourier transforming, the first and second replica fields pass through an analyzer polarizer and superposing the first and second replica fields on a detector array to create four successive detector signals. The four successive detector signals are solved to derive a gradient of the optical phase of the image field, which may be integrated to obtain a quantitative phase image.

10 Claims, 15 Drawing Sheets

(10 of 15 Drawing Sheet(s) Filed in Color)

(56) References Cited

OTHER PUBLICATIONS

King et al., "*Quantitative phase microscopy through differential interference imaging*," Journal of Biomedical Optics, vol. 13(2), 024020, 31 pages (2008).
Edwards et al., "*Effects of spatial coherence in diffraction phase microscopy*," Opt. Express, vol. 22, pp. 5133-5146, (2014).

* cited by examiner

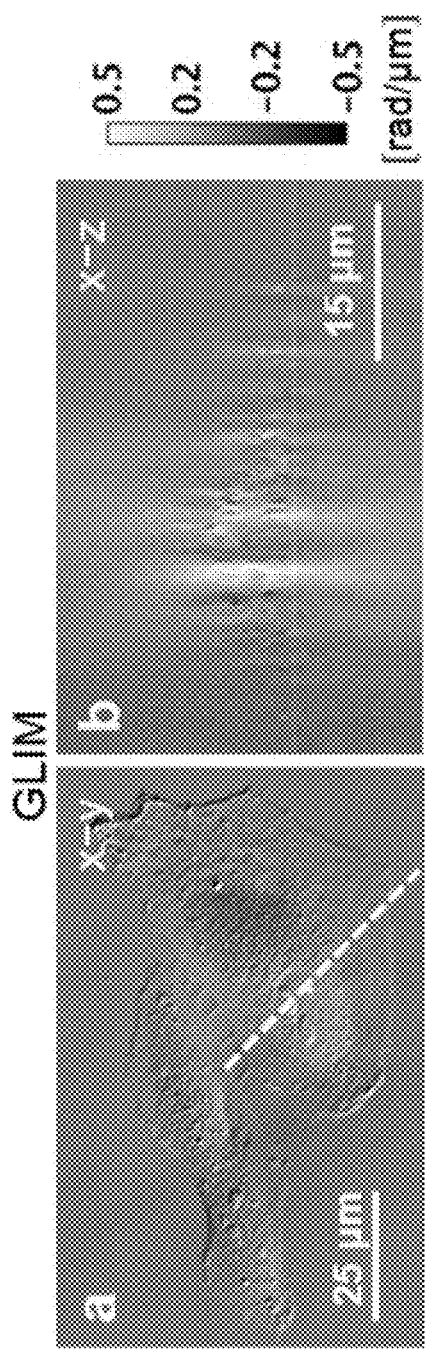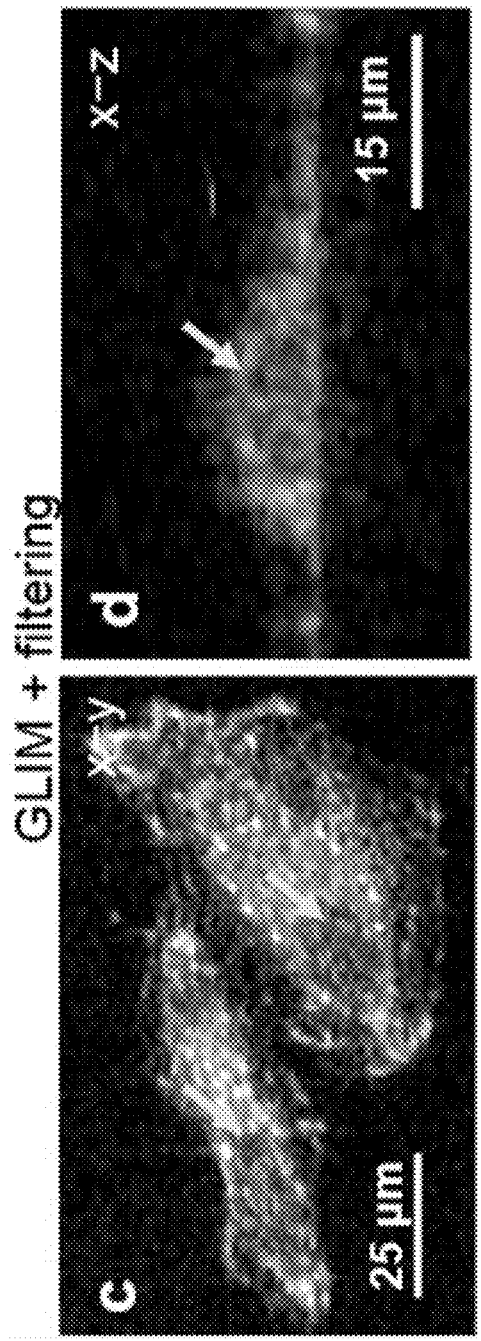
Fig. 3A  Fig. 3B  Fig. 3C  Fig. 3D

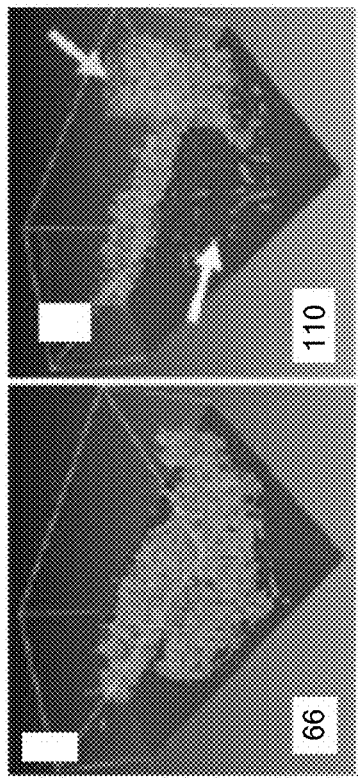
*Fig. 3F* *Fig. 3G* *Fig. 3H* *Fig. 3I* *Fig. 3J* *Fig. 3K*

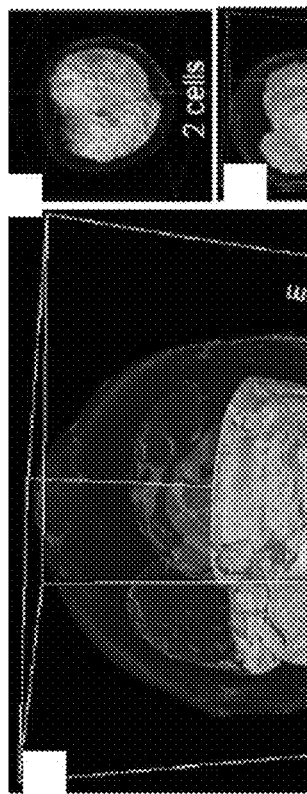
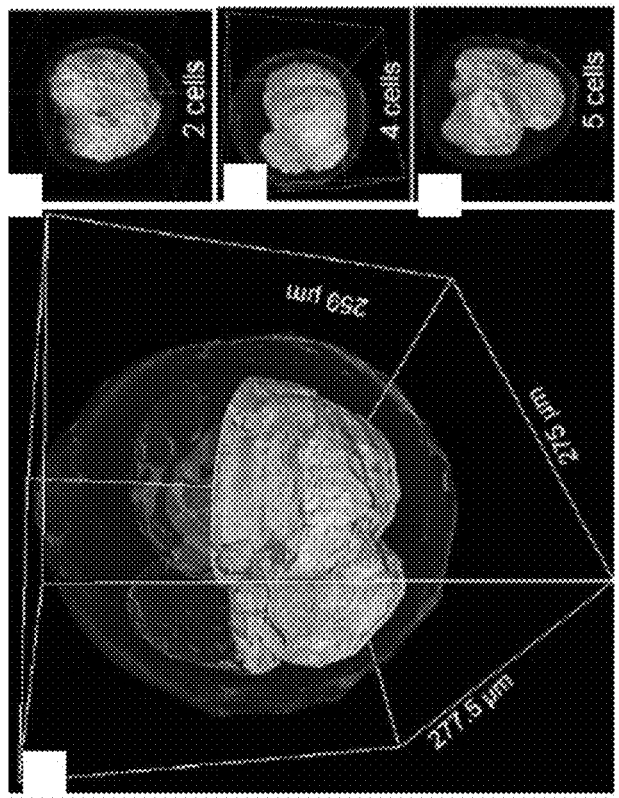
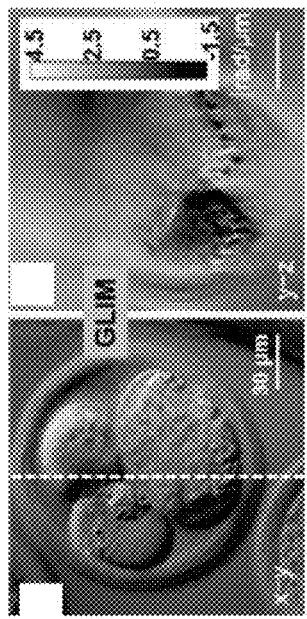
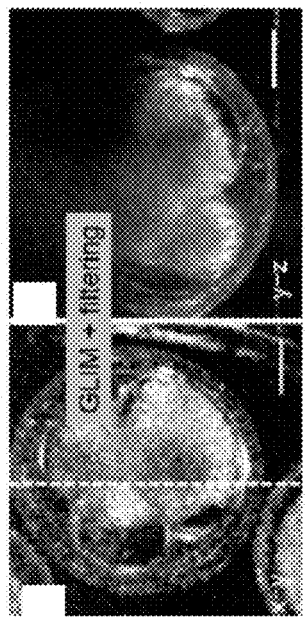
Fig. 5A Fig. 5B Fig. 5C Fig. 5D Fig. 5E Fig. 5F Fig. 5G Fig. 5H

GRADIENT LIGHT INTERFERENCE MICROSCOPY FOR 3D IMAGING OF UNLABELED SPECIMENS

The present application claims the priority of U.S. Provisional Patent Application 62/425,268, filed Nov. 22, 2016, and incorporated herein by reference.

This invention was made with government support under CBET-0939511 STC and IIP-1353368, awarded by the National Science Foundation. The Government has certain rights in the invention.

TECHNICAL FIELD

The present invention relates to systems and methods for quantitative measurement of phase in low-light microscopy of optically thick media, particularly unlabeled cells.

BACKGROUND ART

It has become increasingly clear that understanding morphogenesis and disease requires three-dimensional tissue cultures and models. Effective 3D imaging techniques, capable of reporting on subcellular as well as multicellular scales, in a time-resolved manner, are crucial for achieving this goal. While the light microscope has been the main tool of investigation in biomedicine for four centuries, the current requirements for 3D imaging pose new, difficult challenges. Due to their insignificant absorption in the visible spectrum, most living cells exhibit very low contrast when imaged by visible light microscopy. Consequently, fluorescence microscopy has become the main tool of investigation in cell biology. Due to extraordinary progress in designing fluorescence tags, structures in the cell can be imaged with high specificity.

More recently, super-resolution microscopy methods based on fluorescence have opened new directions of investigation, toward the nanoscale subcellular structure. However, fluorescence imaging is subject to several limitations. Absorption of the excitation light may cause the fluorophore to irreversibly alter its molecular structure and stop fluorescing. This process, known as photobleaching, limits the time interval over which continuous imaging can be performed. The excitation light is typically toxic to cells, a phenomenon referred to as phototoxicity.

Addressing cell cultures in particular, transmitted light modalities appear to be ideal for studying cell growth and proliferation due to low phototoxicity, an absence of photobleaching and easy sample preparation. Yet, such assays are most frequently conducted with the aid of labels. While specificity granted by external markers is crucial for certain applications, quantifying cell growth over longer time scales remains a grand challenge. It has been known for some time that indicators of cell proliferation do not have equal growth. More recent methods using vibrating hollow cantilevers to weigh cell passing through are limited to non-adherent cells. Methods based on vibrating pedestals have also been demonstrated, but at the expense of mass sensitivity.

Label-free microscopy provides a solution to overcoming these limitations. Two classical methods are phase contrast (PC) microscopy and differential interference contrast (DIC) microscopy. Both PC and DIC microscopy indicate modifications to the wavefront of incident light propagating through a sample. However, to date, neither of them has provided a quantitative measure of wavefront deformation in three dimensions.

Along these lines, Cogswell et al., "*Quantitative DIC microscopy using a geometric phase shifter*", *Proc. SPIE 2984, Three-Dimensional Microscopy: Image Acquisition and Processing IV*, (1997) proposed DIC with geometrically-induced phase shifting, applied for two-dimensional (2D) imaging. DIC with two orthogonal shear directions has been used to obtain 2D quantitative phase images, as described, for example by King et al., "*Quantitative phase microscopy through differential interference imaging,*" *Journal of Biomedical Optics*, vol. 13(2), 024020 (2008). Both of these references are incorporated herein by reference.

Quantitative phase imaging (QPI) is an approach that quantitatively ascertains the phase shift in a wavefront propagating through a refractive medium such as a cell. QPI is described in Popescu, *Quantitative Phase Imaging of Cells and Tissues*, (McGraw-Hill, 2011), which is incorporated herein by reference. However, imaging optically thick, multiple scattering specimens is challenging for any optical method, including QPI. The fundamental obstacle is that multiple scattering generates an incoherent background, which ultimately degrades the image contrast. An imaging method dedicated to imaging optically thick specimens must include a mechanism to subdue the multiple scattering backgrounds and exhibit strong spatial sectioning to suppress the out of focus light.

The invention described below in directed toward solving the problem of quantitatively measuring phase shift as a function of position in three-dimensions within a sample, even if it is optically thick and gives rise to multiple scattering.

SUMMARY OF EMBODIMENTS OF THE INVENTION

In accordance with embodiments of the invention, a method is provided for quantitative optical phase imaging of a sample characterized by a surface. The method has steps of:

generating a first and a second replica field of an image field, each of the image field and the first and second replica fields characterized by a respective optical phase, the second replica field cross-polarized and shifted in a shift direction transverse to a normal to the surface of the sample by a transverse offset;

spatially Fourier transforming the first and second replica fields;

retarding the second replica field by four successive phase shifts;

inverse Fourier transforming the first and second replica fields;

passing the first and second replica field through an analyzer polarizer and superposing the first and second replica fields on a detector array to create four successive detector signals; and solving the four successive detector signals to derive a gradient of the optical phase of the image field.

In accordance with other embodiments of the invention, retarding the second replica field may include employing a spatial light modulator. The four successive phase shifts may be integral multiples of $\pi/2$, and the transverse offset may be smaller than a diffraction spot characterizing an optical system whereby the first and second replica fields are obtained.

In accordance with further embodiments of the invention, the method may also have a step of integrating the gradient of the optical phase to obtain an image of the optical phase of the image field. Solving the four successive detector signals may also include deriving a mutual intensity function between the first and second replica fields.

In accordance with another aspect of the present invention, a system is provided for quantitative optical phase imaging of a sample. The system has a microscope for generating a first and a second replica field of an image field, where each of the image field and the first and second replica fields is characterized by an optical phase. The second replica field is cross-polarized and shifted in a shift direction transverse to a normal to the surface of the sample by a transverse offset. The system also has a first lens for spatially Fourier transforming the first and second replica fields, a spatial light modulator for retarding the second replica field by four successive phase shifts; and a second lens for inverse Fourier transforming the first and second replica fields. An analyzer polarizer is aligned at 45° with respect to respective polarizations of the first and second replica fields, A detector array creates four successive detector signals, and a processor is provided for solving the four successive detector signals to derive a gradient of the optical phase of the image field.

In accordance with other embodiments of the invention, the microscope may includes a Wollaston prism for separating the first and second replica fields.

In accordance with yet a further aspect of the present invention, a module is provided for receiving a first and a second replica field of an image field of a sample characterized by a surface and for quantitative optical phase imaging of the sample. The module has a first lens for spatially Fourier transforming the first and second replica fields, a spatial light modulator for retarding the second replica field by four successive phase shifts, a second lens for inverse Fourier transforming the first and second replica fields, and an analyzer polarizer aligned at 45° with respect to respective polarizations of the first and second replica fields.

In accordance with yet another aspect of the present invention, a method is provided for assessing viability of an embryo. The method has steps of:

generating a first and a second replica field of an image field containing the embryo, each of the image field and the first and second replica fields characterized by a respective optical phase, the second replica field cross-polarized and shifted in a shift direction transverse to a normal to the surface of the sample by a transverse offset;

spatially Fourier transforming the first and second replica fields;

retarding the second replica field by four successive phase shifts;

inverse Fourier transforming the first and second replica fields;

passing the first and second replica field through an analyzer polarizer and superposing the first and second replica fields on a detector array to create four successive detector signals;

solving the four successive detector signals to derive a gradient of the optical phase of the image field; and applying morphokinetic criteria to a function of the gradient of the optical phase to characterize embryo viability.

BRIEF DESCRIPTION OF THE DRAWINGS

The current patent or application file contains at least one drawing executed in color. Copies of this patent or patent application publication with color drawing(s) will be provided by the Office upon request and payment of the necessary fee.

The foregoing features of the invention will be more readily understood by reference to the following detailed description, taken with reference to the accompanying drawings, in which:

FIGS. 2A-2C depict time-lapse GLIM imaging of a HeLa cell culture. FIG. 2A depicts an image sequence composed of 16×20 mosaic tiles, each of 280×277 $\mu m^2$ area, with an acquisition performed every 16 minutes. FIG. 2B shows an image of each mosaic tile of a small region in FIG. 2A. FIG. 2C shows a zoomed-in region of FIG. 2B. The resulting image is well suited to observing cellular morphology, in particular, cells nucleoli are well represented (white arrows in FIG. 2C).

FIGS. 3A-3M depict GLIM imaging of a Hela cell culture, in accordance with an embodiment of the present invention. FIG. 3A is an x-y cross-section and FIG. 3B is an x-z cross-section of the GLIM phase gradient measurement. Dashed line denotes the locations of the cross-section. FIG. 3C shows the x-y cross-section—and FIG. 3D shows the x-z cross-section—after spatial filtering. FIGS. 3E-3K show renderings of the cell tomography results at different time points, as indicated. FIG. 3L shows mass-vs.-volume—and FIG. 3M, area-vs.-volume—measurements extracted from GLIM tomography data.

FIG. 4A depict GLIM images of bovine embryos observed under regulated atmospheric conditions, with a 40×/0.75 objective and a fully open condenser. FIG. 4B plots quantitatively the internal structure dynamics of embryos using the DIM, based on the time derivative of the stack. DIM shows a continuous decrease over several hours prior to the embryo death.

FIGS. 5A-5H show GLIM imaging for thick embryos, in accordance with an embodiment of the present invention. FIG. 5A is an x-y cross-section and FIG. 5B is a y-z cross-section of raw GLIM images in a bovine embryo. FIG. 5C shows the x-y cross-section—and FIG. 5D the y-z cross-section—after spatial filtering. FIG. 5E shows a rendered embryo that was cut through the center to reveal internal structures. FIGS. 5F-5H show bovine embryos at different points in their development stages, as indicated.

FIG. 7A depicts measurements of the dry mass, surface area, volume and dry mass density of 17 Hela cells from two different FOVs. FIG. 7B depicts measurements of the relative dry mass, relative surface area, relative volume, sphericity and relative dry mass density of 17 Hela cells. It can be seen that the dry mass density and sphericity increase significantly during mitosis. These time points are specified by the black arrows.

FIG. 8A shows raw x-z cross-sections of the GLIM images of 4.5-μm beads immersed in oil for different values of $NA_{con}$ with the same dynamic range applied. It can be seen that the contrast decreases in accordance with the spatial coherence of the illumination. FIG. 8B shows contrast-enhanced images of the images in FIG. 8A. Clearly, depth sectioning improves when the spatial coherence is smaller.

DETAILED DESCRIPTION OF EMBODIMENTS OF THE INVENTION

Definitions

Figure 1A:
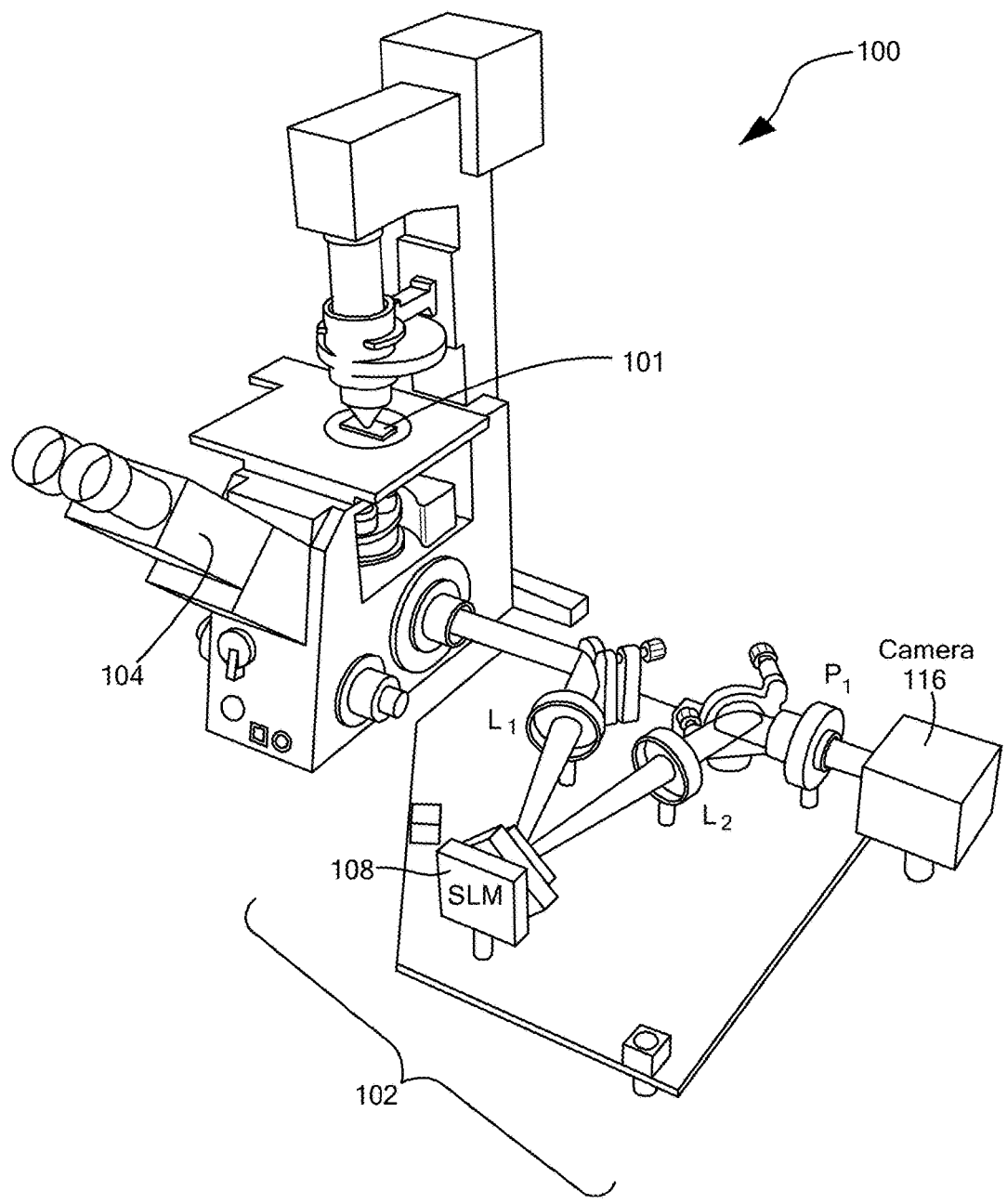
FIG. 1A depicts a GLIM optical setup in accordance with an embodiment of the present invention.

The following terms shall have the meanings indicated, unless otherwise dictated by context:

As used herein, the term "detector" shall refer broadly to a focal plane detector array and any associated optics constituting a camera and bringing fields to focus on a detector array.

The term "image" shall refer to any multidimensional representation, whether in tangible or otherwise perceptible form, or otherwise, whereby a value of some characteristic (amplitude, phase, etc.) is associated with each of a plurality of locations corresponding to dimensional coordinates of an object in physical space, though not necessarily mapped one-to-one thereonto. Thus, for example, the graphic display of the spatial distribution of some field, either scalar or vectorial, such as brightness or color, constitutes an image. So, also, does an array of numbers, such as a 3D holographic dataset, in a computer memory or holographic medium. Similarly, "imaging" refers to the rendering of a stated physical characteristic in terms of one or more images.

The terms "object," "sample," and "specimen" shall refer, interchangeably, to a tangible, non-transitory physical object capable of being rendered as an image.

In accordance with embodiments of the present invention, a new QPI method is described herein, referred to as gradient light interference microscopy (GLIM). GLIM combines DIC microscopy with low-coherence interferometry and holography. In GLIM, two interfering fields are identical except for a small transverse spatial shift. This geometry ensures that the two fields suffer equal degradation due to multiple scattering. By accurately controlling the phase shift between the two waves, multiple intensity images are acquired that share the same incoherent background, but differ with respect to coherent contributions. As a result, GLIM can reject much of the multiple scattering contributions and yield remarkable contrast of thick objects.

Furthermore, GLIM is performed, as described below, with a fully-open condenser aperture (not shown), providing, as will be described, a small numerical aperture {Inventors: right?} and, thus, very strong optical sectioning. GLIM may advantageously provide tomographic imaging of both thin samples, e.g., single cells, and thick specimens, such as multicellular systems. The principles of GLIM operation are provided below, along with validation results on test samples, and time-resolved tomography of cells in culture, as well as embryo development.

GLIM enjoys the benefits of common-path white-light methods including nanometer path length stability, substantially speckle-free, and diffraction-limited resolution. At the smallest condenser aperture, GLIM gives exact values of the quantitative phase for thin samples. At the largest condenser aperture, GLIM can be used as a tomography method, providing three-dimensional information of thick imaging samples. GLIM has been demonstrated on various samples, including beads, Hela cells and bovine embryos.

With reference, first, to FIG. 1A, GLIM system 100 includes an add-on module (or, "GLIM module") 102 to a commercial DIC microscope 104 such a microscope employing a Normarski Interference Set available from Carl Zeiss, Inc. for use with an Axiovert 200M. Via a Wollaston prism (not shown), the DIC microscope 104 generates two replicas of the image field of illumination traversing a specimen 101, cross-polarized and shifted transversely with respect to one another by a distance smaller than the diffraction spot.

An analyzer polarizer (not shown) that would ordinarily be used in DIC to render the two polarizations parallel, is not used in the present invention. Instead, both replicas of the image field enter the GLIM module 102. These replica fields are spatially Fourier transformed by the lens $L_1$ at its back focal plane, the plane of a spatial light modulator (SLM 116) in FIG. 1. Both fields are inversely Fourier-transformed by lens $L_2$ to generate an image at the camera plane 114. A linear polarizer, $P_1$ (also referred to herein as an "analyzer polarizer"), is aligned at 45° with respect to both polarizations to render them parallel. The resulting field at detector 118 is a coherent superposition of two fields, namely, $$U_n(r)=U(r)+U(r+\delta r)e^{i\phi_n}, \quad (1)$$

where $\delta r=\delta x\hat{x}$ is the spatial offset between the two replica fields and U is the image field.

The intensity for each phase shift, $I_n(r)=|U_n(r)|^2$, can be written as $$I_n(r)=I(r)+I(r+\delta r)+2|\gamma(r;\delta r)|\cos[\phi(r+\delta r)-\phi(r)+\phi_n], \quad (2)$$

where $I(r)$ and $\phi(r)$ are, respectively, the intensity and phase of the image field, and $\gamma$ is the mutual intensity, i.e., the temporal cross-correlation function between these two fields, evaluated at zero delay, $\gamma(r,\delta r)=\langle(U^*(r)U(r+\delta R)\rangle_t$. The phase $\phi_n=n\pi/2$ is the modulated phase offset between the two fields, externally controlled by a spatial light modulator (SLM) 116, disposed. It is to be understood that phase offsets between the two fields that are not multiples of $\pi/2$ are similarly encompassed within the scope of the present invention as claimed.

Figures 1B, 1C:
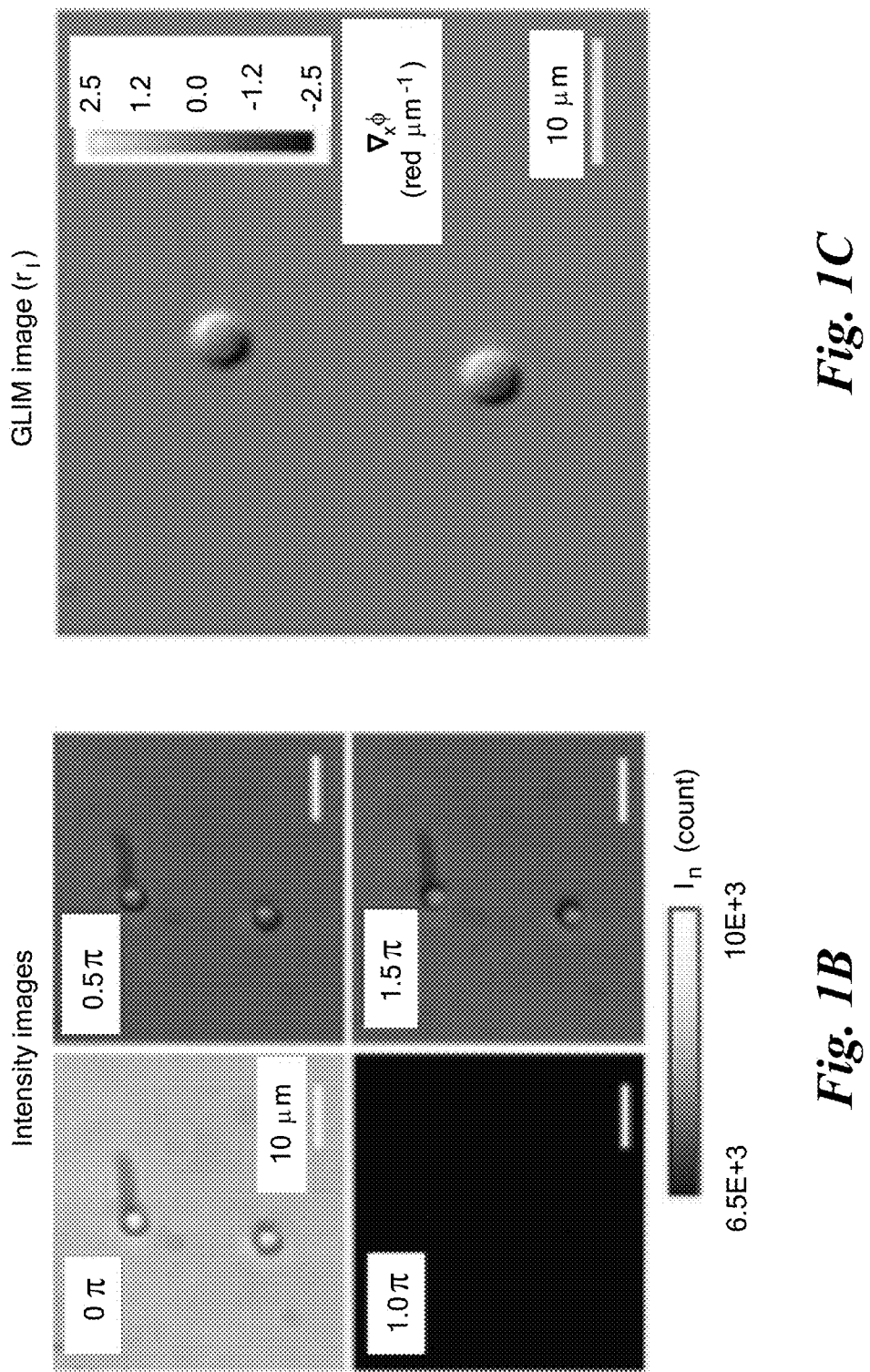
FIG. 1B shows four frames acquired by the GLIM module.
FIG. 1C is an extracted quantitative gradient map of two 3-um polystyrene beads immersed in oil.
Figure 1E:
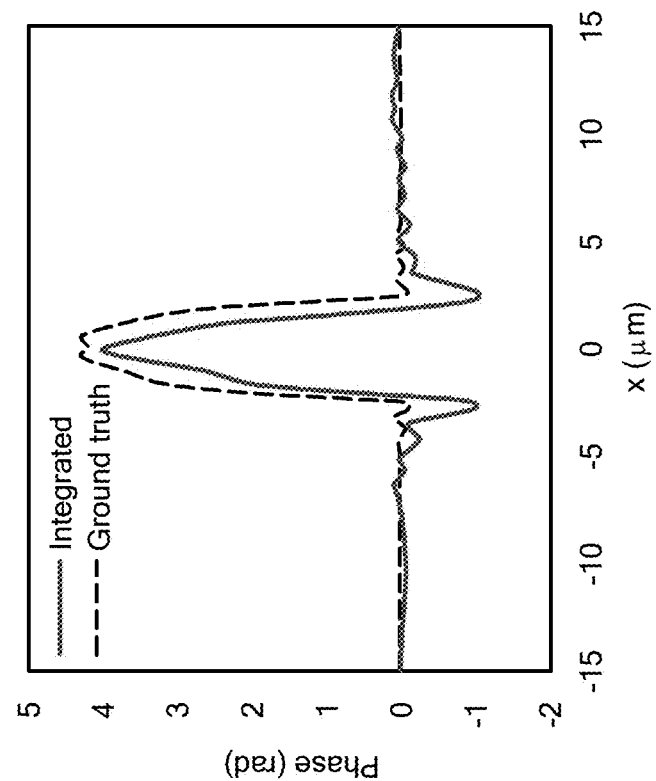
FIG. 1E shows cross-sections of the reconstructed phase and the computed ground truth (dashed curve), taking into account blurring due to diffraction.

Imaging the fields interfering at detector 116 at four respective phase offsets gives rise to four intensity images, $I_n$, $n=1, \ldots, 4$, as shown in FIG. 1B. The four intensity images provide for solution for $I(r)$, $|\gamma(r,\delta r)|$, and $\Delta\phi(r)=\phi(r+\delta r)-\phi(r)$. These data render quantitatively the gradient of the phase along the direction of the shift, $\nabla_x\phi(r)\approx\nabla\phi(r)/\delta x$, as shown in FIG. 1C. Detailed procedures for extracting the phase gradient and estimating $\delta x$ may be found below.

Given the phase gradient, $\nabla_x\phi$, one can integrate along the gradient direction to get phase value, $\phi(r)$, using $$\phi(x,y)=\int_0^x[\nabla_x\phi(x',y)]dx'+\phi(0,y),$$

where $\phi(0,y)$ is the initial value, which can be obtained with prior knowledge with respect to aspects of the specimen. For example, if $(0, y)$ is a background location, the phase $\phi(0, y)$ is set to 0 radians.

Example 1: Polystyrene Micro-Beads

Figure 1D:
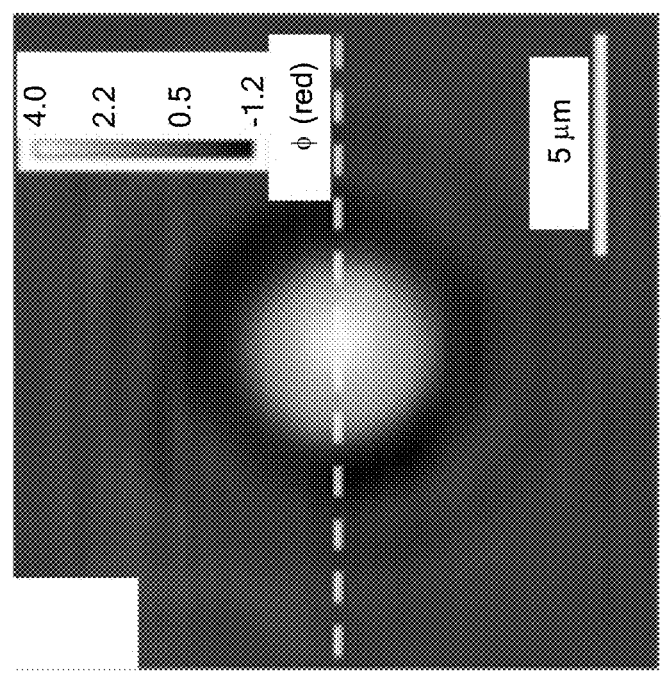
FIG. 1D is an integrated phase map of a 4.5-μm polystyrene microbeads at a condenser numerical aperture $NA_{con}$=0.09.

FIG. 1D demonstrates the capability of GLIM to extract quantitatively the phase gradient, where a 4.5±5% μm polystyrene micro-bead (Polysciences Inc.), with a refractive index value of 1.59 at the central wavelength, is imaged. The beads are immersed in oil (Zeiss Inc.) with a refractive index value of 1.518 to generate a total phase shift of 3.87 radians. FIG. 1D shows the measured phase gradient at $NA_{con}$=0.09. FIG. 1D shows the quantitative phase map, ϕ(r), and FIG. 1E displays a line profile through the center of the bead.

Example 2: Hela Cells

Figure 2B:
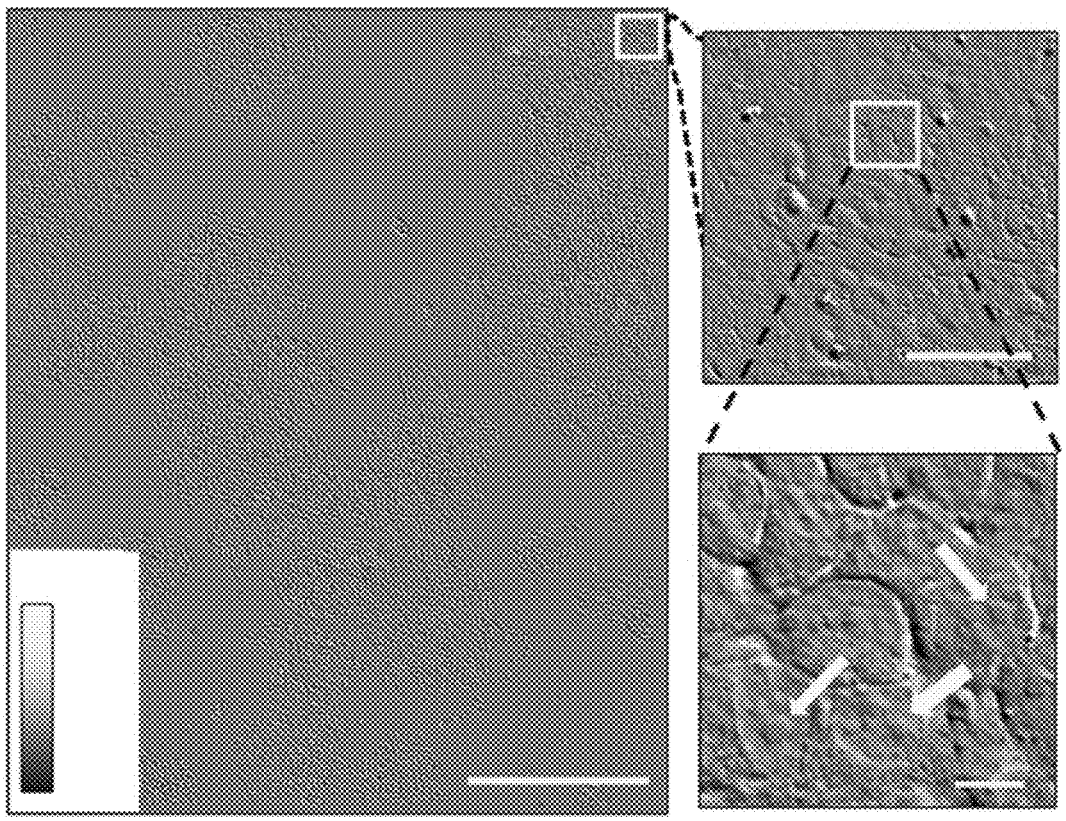

Growth and proliferation of large populations of adherent cells over extended periods of time is demonstrated with reference to FIGS. 2A-2C. Specifically, the culture may be characterized by extracting parameters such as single cell mass, volume, surface area, while simultaneously measuring the intracellular transport on timescales associated with the cell cycle. FIG. 2A shows scanning GLIM data of Hela cells in culture over a 4.48×5.54 mm² field of view. This image is a mosaic consisting of 16×20 individual frames, imaged by a 40×/0.75 NA objective, and a condenser aperture ($NA_{con}$) adjusted to $NA_{con}$=0.32. FIGS. 2B & 2C show magnified views at different scales for a region denoted by the white box in FIG. 2A. The acquisition took approximately 3 minutes for each 16×20 frame, which was assembled into a time-lapse mosaic following the procedure outlined method section. The GLIM image 210 (shown in FIG. 2C) provides a quantitative phase gradient map at the spatial resolution of the objective, clearly showing fine structures such as nucleoli pointed by white arrows.

In order to measure growth rates, the phase values are obtained by integrating the phase gradient at each frame in a time lapse series. These phase values are used to calculate the cell dry mass, using the linear relationship between optical pathlength map of a cell and its dry mass density, as first described by Barrer, "*Interference microscopy and mass determination,*" *Nature*, vol. 169, pp. 366-67 (1952), incorporated herein by reference. Quantitative phase imaging may be used to extract cell growth data based on this principle. A mass doubling period of approximately 36 hours was observed, which is 50% longer than the typical cell number doubling time, as cells can divide without doubling in mass.

Example 3: Tomography of Single Cells Using GLIM

Due to the high numerical aperture of the illumination, excellent sectioning capabilities may be advantageously achieved in accordance with embodiments of the present invention, yielding tomographic imaging of both thin and thick samples. Referring now to FIGS. 3A-3M, GLIM tomography was applied to a 30% confluence HeLa cell culture over 21 hours. Seven fields of view (FOVs) were imaged using a 63×/1.4 NA objective with a spatial sampling rate of 10.8 pixels/μm.

Each FOV was scanned every 22 minutes. For each time point, the sample was scanned over a total depth of 28 μm with a step size of Δz=0.07 μm. FIGS. 3A and 3B show the x-y and x-z cross-sections of the GLIM measurement, i.e., the quantitative phase gradient. In order to remove the background due to weak sectioning at small scattering angles, a spatial filtering operation was performed. FIGS. 3C and 3D shows the corresponding x-y and x-z cross-sections of the filtering, with yellow arrows pointing to the locations of the nucleus. Clearly, the x-z cross-section of the tomograms shows significant improvements in depth sectioning.

Compared to the phase gradient image, $\nabla_x \phi$, this cross-section has no diffraction streaks or "shadow" artifacts and clear cell boundaries. FIGS. 3E-3K shows the GLIM tomograms obtained via filtering, at seven different time points. The cell nuclei were segmented and shown in orange while the cell membranes are displayed in green using iso-surface rendering. The rendered images clearly show different 3D structures of the cells. It can be further seen that during the mitosis phase (the 110 min. and 264 min. frames), the cells assumed a spherical shape during interphase (pointed by yellow arrows in FIG. 3G). Also, at the 110-minute point, while forming a mitotic sphere, the cells appear to leave behind biomass that is adherent to the substrate. These biomasses are pinpointed by a white arrow in FIG. 3G.

Figure 3E:
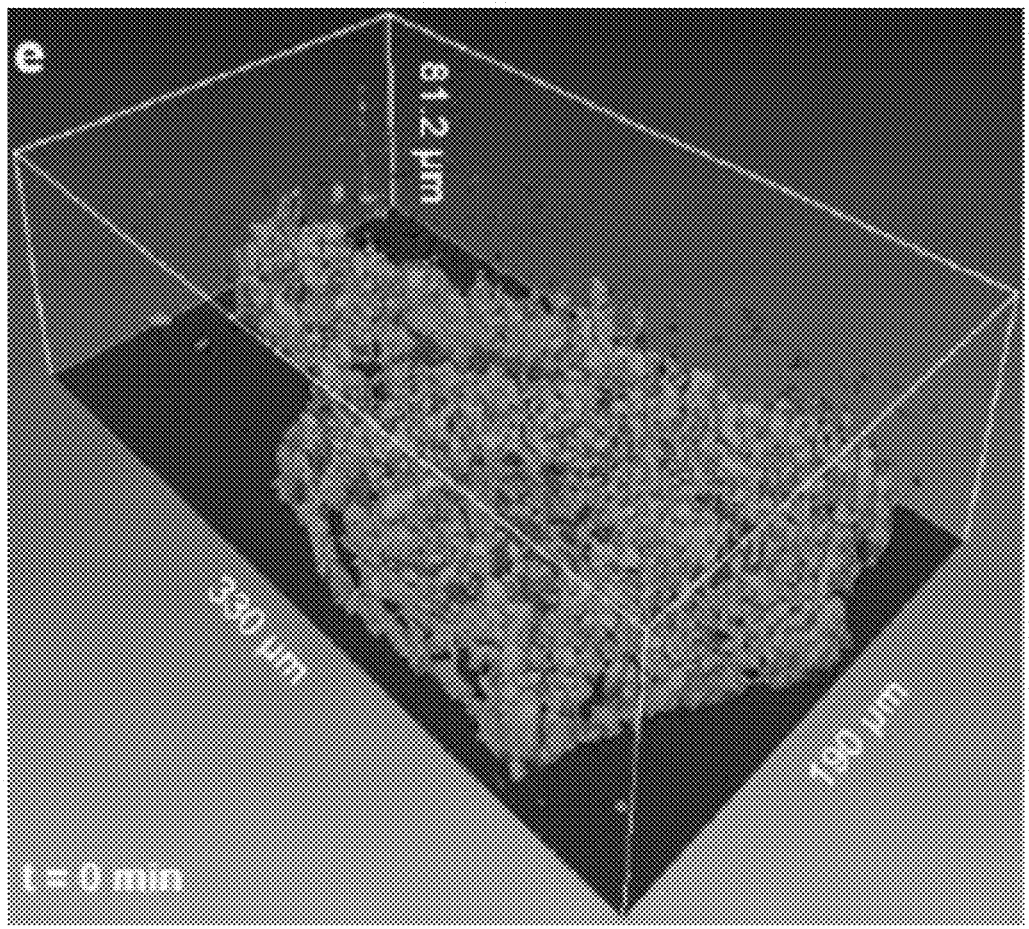
Figure 3L:
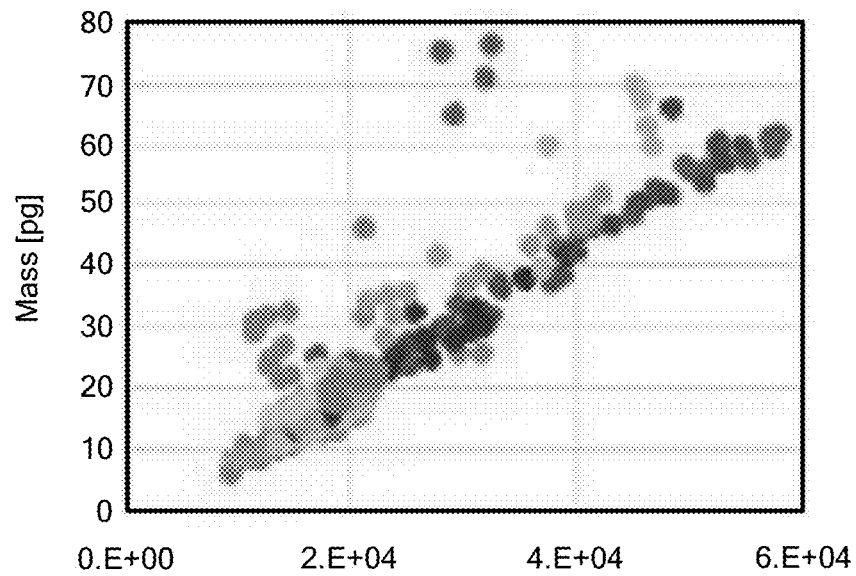
Figure 3M:
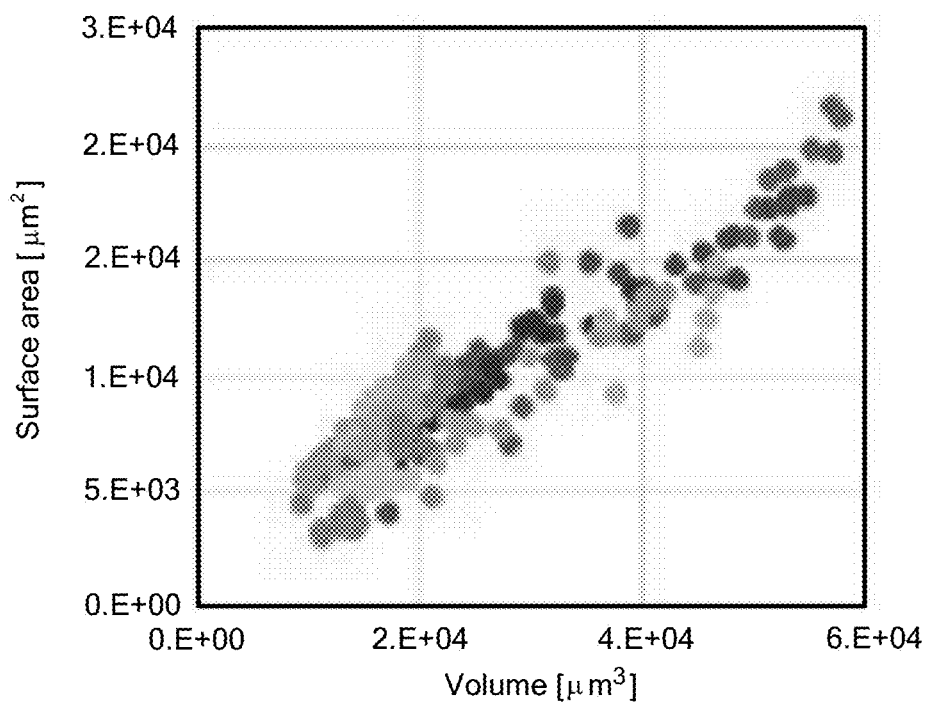

By virtue of the depth sectioning provided by GLIM, several parameters may be computed for each cell and their time evolution may be studied. FIG. 3L shows the dry mass vs. volume for several different cells during the 21-hour window. Each point in these plots corresponds to one cell at one time-point. These results show that, for the most part, the points align along a straight line. Points deviating from this line correspond to cells going through mitosis. This result indicates that there is a significant density increase during mitosis. Meanwhile, the surface area vs. volume relation shown in FIG. 3M is essentially linear with slightly different slopes for different cells over the whole cell cycle.

Example 4: GLIM Investigation of Embryo Viability

The percentage of live births from Assisted Reproductive technology (ART) procedures is still rather low. One reason is because of the lack of objective and accurate evaluation of the embryo quality and viability before transfer. Morphological assessment is currently the main method used to determine embryo viability during in-vitro fertilization (IVF) cycles. However, studies have shown that the predictive power of the typical day 2 and 3 assessment of morphological parameters has remained low.

GLIM may be advantageously employed to perform tomography on optically thick specimens such as embryos. In one experiment, 60 bovine embryos were imaged, starting at 12 hours after fertilization, sampling every 30 minutes, over a seven-day period, using a 40×/0.75 NA objective. The lipid droplets, prominent in bovine embryos can be clearly identified. Results obtained in accordance with the present invention show that the embryo internal dynamics changes completely when the embryo dies. Specifically, the internal mass transport halts almost entirely, which suggest either a great increase in viscosity of the material or that the dynamic transport is mostly due to molecular motors, which stop in dead cells.

In accordance with embodiments of the present invention, a dynamic index marker (DIM) is based on GLIM data. For each image, the phase difference $\Delta\phi(r_\perp, t)$ and the mutual intensity $\gamma(r_\perp, \delta r, t)$ are combined at each time point t. To measure morphological changes, the time derivative image of γ is computed, i.e., $\gamma'_t(r_\perp) = d\gamma(r_\perp, \delta r, t)/dt$. Based on $\gamma'_t$, the spatial Cumulative Distribution Function (CDF) of the time derivative images is computed, $F_t(x) = P(\{\gamma'_t(r_\perp)\}_{r_\perp \in FOV} < x)$, which is a probability that the time derivative is less than a value x, its input argument. The cut-off difference (distance of x) at 10% and 90% of the CDF for each time point t is defined as $D_t = \arg\min_{x_1}[F(x_1) > 0.9] - \arg\min_{x_2}[F(x_2) > 0.1]$. Finally, the DIM is defined as the relative ratio between $D_t$ and its maximum over the imaging duration, $\max_{t_i}(D_{t_i})$, namely $$DIM = [D_t / \max_{t_i}(D_{t_i})].$$

Figure 4B:
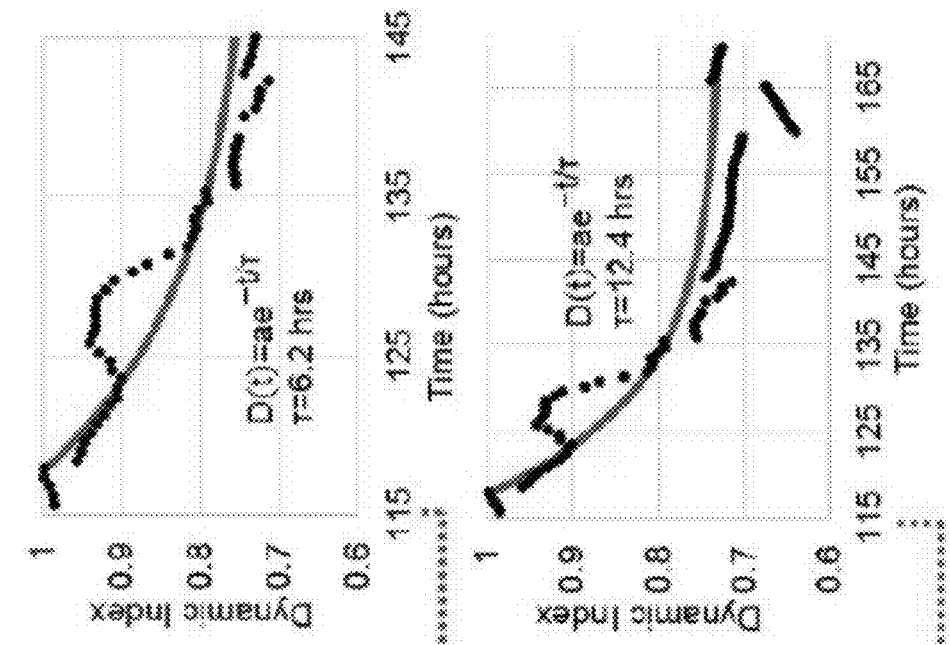
FIGS. 4A and 4B depict the use of GLIM for the study of embryo viability, in accordance with an embodiment of the present invention.
Figure 4A:

During periods of inactivity, the spatial distribution of $\gamma'_t$ across the embryo is substantially uniform and the histogram is narrow compared to periods of higher activity. It has been found that between the point of apparent normal, dynamic behavior and the one complete lack of dynamics, there exists a continuous process that lasts many hours, as shown in FIG. 4A. This process is well captured by the intrinsic DIM quantity, as shown in FIG. 4B. DIM decreases continuously over several hours until it reaches the point where the embryo motion is suppressed. It is to be understood that other morphokinetic criteria may be similarly employed in accordance with the present invention.

Example 5: Embryo Tomography with GLIM

Three-dimensional GLIM stacks of bovine embryos were obtained at different development stages. A 63×/1.4 NA oil immersive objective was employed at a transverse sampling rate of 10 pixel/μm. The condenser aperture was fully opened $NA_{con} = 0.55$ to maximize the depth sectioning and spatial resolution. The embryos were scanned in the axial dimension over an interval of [−120 μm, 120 μm] with a step of $\Delta z = 0.05$ μm. FIGS. 5A and 5B show the x-y and x-z cross-sections of the raw phase gradient, respectively. The corresponding cross-sections of the GLIM tomogram are shown in FIGS. 5C and 5D. The GLIM tomography reveals various structures of the embryos, including their membranes, internal cells, gaps between the membrane of the cells and their internal content, lipid droplets in each cell, as indicated in FIG. 5E. The x-z cross-sections further show the contact between the embryo and the underlying glass substrate (FIG. 5E), and the debris on the substrate.

FIGS. 5F-5H show the rendering results of three different embryos, consisting of two cells, four cells, and five cells, as indicated. One can see clearly how different cells of the embryos stack with respect to each other in 3D. The membranes of the embryos are manually segmented and displayed as transparent surfaces.

Procedures:
Phase Gradient Extraction from Intensity Images

The intensity image at modulation $\phi_m$ is given by $$I_n(r) = I(r) + I(r + \delta r) + 2|\gamma(r; \delta r)|\cos[\Delta\phi(r) + \phi_n],$$

where $\Delta\phi = \phi(r + \delta r) - \phi(r) \approx \nabla_x(\phi)\delta x$, the phase difference of interest, and $\nabla_x\phi$ is the gradient of the phase of the image field in the x-direction. The spatial shift $\delta x$ is the transverse displacement introduced by the DIC prism (also referred to herein as the lateral offset between the two DIC beams), estimated experimentally from measurements of the test samples. The quantity $\gamma(r, \delta r)$ is the mutual intensity, i.e., the temporal cross-correlation function between these two fields, evaluated at zero delay, $\gamma(r, \delta r) = \langle U^*(r)U(r+\delta r)\rangle_t$. Combining the four intensity frames, the phase gradient is obtained as $$\nabla_x\phi(r) = \arg\{[I_4(r) - I_2(r)], [I_3(r) - I_1(r)]\}/\delta x$$

DIC Shear Estimation

The lateral offset $\delta x$ between the two DIC beams relates the phase difference image, $\Delta\phi$ linearly to a quantitative phase gradient $\nabla_x\phi$ via the relation $\Delta\phi = \nabla_x\phi\delta x$. This parameter is known to the microscope manufacturer (Zeiss, Olympus, etc.), however it may not be known to the user. To estimate the spacing between the two beams, the associated phase shift is matched to a known calibration sample. In a preferred procedure, a fine tomographic stack of a small object (300 nm bead) is acquired, and line integration is performed in the direction of the DIC gradient. It is to be expected that the phase is maximized at the plane of best focus. The peak of the integrated phase corresponds to the theoretical maximum phase shift due by the control structure of $\varphi^* = (2\pi d \Delta n / \lambda_o)$, where $\Delta n$ is the refractive index mismatch between the sample and the background, $\lambda_0$ is the central wavelength, and d is the diameter of the bead. However, given a pixel dimension of p (in units of μm), the following relationship obtains:

$$\varphi^* = \int_{x_o}^{x^*} \nabla_x\varphi\, dx = \int_{x_o}^{x^*} \Delta\phi dx/\delta x \approx p\sum_{k=k_o}^{k^*} \Delta\phi[k]/\delta x,$$

where $x_o$, $x^*$ are locations of the background and the center of the bead. These locations correspond to pixel indices of $k_0$, and $k^*$, respectively. Combining these two relations yields:

$$\delta x = \frac{p\lambda_o \sum_{k=k_o}^{k^*} \Delta\varphi[k]}{2\pi d \Delta n}.$$

Spatial Light Modulator (SLM) Calibration

SLM gray values are calibrated against modulating phase by imaging the sample plane without the sample, i.e., $\Delta\phi(r) = 0$. First, intensity images, $I_g$ are acquired, where g corresponds to the SLM grayscale values on an 8-bit dynamic range. As a side note, one can further extend the resolution of the SLM modulation to one more bit by mixing discrete values on the SLM using a "checkerboard" pattern. More specifically, the modulation value set to the pixel x is given as $$S_{g+0.5}[x] = \begin{cases} g, & \text{if } x \text{ is even}, \\ g+1, & \text{if } x \text{ is odd}. \end{cases}$$

The intensity image $I_g$ recorded by the camera for the grayscale value g is $$I_g = I_1 + I_2 + 2\sqrt{I_1 I_2}\cos[\phi(g)],$$

where $I_1$ is the intensity of the modulated field, $I_2$ is the intensity of the un-modulated field, and $\phi(g)$ is the phase modulation of interest. Using an empirical I(g) curve for $g \in [0, 255]$, we obtain $\cos[\phi(g)] = \{[I_g - \alpha]/\beta\}$, where $\alpha = \{[\max_g[I_g] + \min_g[I_g]]/2\}$, and $\beta = \{[\max_g[I_g] - \min_g[I_g]]/2\}$. Next, a Hilbert transform is used to obtain the complex analytic signal associated with the cosine signal, the imaginary part of which is $\sin[\phi(g)] = H\{[I_g - \alpha]/\beta\}$. Here, H(.) denotes the operator to compute the Hilbert transform from a real part of a complex analytic signal to get the imaginary part. Combining the sine(.) and the cosine(.) signals, one obtains:

$$\phi(g) = \arg\langle [I_g - \alpha]/\beta, H\{[I_g - \alpha]/\beta\}\rangle.$$

The $\phi(g)$ curve represents the desired SLM calibration. Note that there are many sets of four points that can be chosen for the working phase shift. Preferably, the portion of the curve that is most linear is to be chosen. From this curve, the π/2 sequence is chosen to meet two complementary criteria: maximum visibility and minimal phase error. To maximize the visibility, we evaluate several points around each amplitude maxima and choose the calibration where the steps are nearest to multiples of π/2. When multiple peaks are present, the peak most closely resembling a sinusoid is preferred.

Two-Dimensional Image Formation in GLIM

Consider a thin sample with a transmission function $T(r_\perp)$, the total incident field on which consists of two cross-polarizations. The two cross-polarizations generate two sample fields on the camera plane of $U_1(r_\perp)=\{[U_i(r_\perp)T(r_\perp)]\circledv_{r_\perp} h_o\}(r_\perp)$, and $U_2(r_\perp)=\{[U_i(r_\perp)T(r_\perp-\delta r]\circledv_{r_\perp} h_o\}(r_\perp)$, where $h_o$ is a point-spread function characterizing the limited-aperture diffraction of the objective. The temporal cross-correlation function at zero delays, τ=0, or the mutual intensity function of these two sample fields is:

$$\gamma(r_\perp, \delta r) = \langle U_1(r_\perp) U_2^*(r_\perp) \rangle_t$$

$$= \int \Gamma_i(r'_\perp - r''_\perp) T(r'_\perp) T^*(r''_\perp - \delta r) h_o(r_\perp - r'_\perp) h_o^*(r_\perp - r''_\perp) d^2 r'_\perp d^2 r''_\perp.$$

Here, $\Gamma_i(.)$ is the mutual intensity function of the illumination at the sample plane. When the numerical aperture of the object, $NA_o$, is large enough so that the spatial resolution is finer than any structure of the interest in the sample, the point spread function (PSF) $h_o$ can be approximated as $h_o(r_\perp) \approx \delta^{(2)}(r_\perp)$, simplifying the foregoing expression into $$\gamma(r_\perp,\delta r)=\Gamma_i(\Delta r=0)T(r_\perp)T^*(r_\perp-\delta r).$$

Consequently, $$\Delta\phi(r_\perp)=\arg[\gamma(r_\perp,\delta r)]\approx\phi(r_\perp)-\phi(r_\perp-\hat{x}\delta x).$$

with ϕ=arg(T), which means that GLIM gives the correct phase difference of the sample irrespective of the coherence of the illumination. This is different from other common-path interferometry methods where the measurement reduction is highly dependent upon $NA_{con}$, as discussed in Edwards, C. et al., "*Effects of spatial coherence in diffraction phase microscopy,*" Opt. Express, vol. 22, pp. 5133-5146 (2014), and Nguyen et al., "*Quantitative phase imaging with partially coherent illumination,*" Opt. Lett., vol. 39, pp. 5511-14 (2014), both of which are incorporated herein by reference.

Two-Dimensional Real-Time Interferometric Reconstruction

A software platform capable of mechanical automation and real-time phase retrieval was developed in order to fully automate GLIM data acquisition. An image acquisition platform is designed to overlap the GLIM computation with the operation of the camera, SLM, and microscope. The software is developed in C++ using the Qt framework. The real-time reconstruction runs on three threads with the first thread responsible for triggering new camera frames and modulating the SLM. The second thread receives incoming images and transferred them to the graphics card. The third thread is used to display the GUI and render the resulting phase maps (see FIG. 7a). Since we decouple the triggering thread from the data transfer and computation threads, variability in camera transfer rates does not slow down the acquisition.

To remove the background curvature in real-time, Fourier band-pass filtering is performed to eliminate any slow-varying oscillation in the GLIM images. To improve the SNR of the reconstruction, mean intensities of the four frames are matched by proportionally adjusting the exposure time. For example, the exposure time is eight times longer for the extinction frame (π modulation) compared to maximum brightness frame (0π modulation). The longer exposure is later compensated numerically in extracting the phase. This operation results in an increased Signal-to-Noise Ratio (SNR), as illustrated by the standard deviation of the phase noise.

A GLIM system fabricated in accordance with one of the embodiments of the present invention operates at 10 phase images per second with a rendering rate at 40 frames per second. Since the computational portion is overlapped with acquisition, the rate-limiting factor in that system is exposure time. Thus, the longer exposure can be replaced by illumination with a brighter source.

Assembling the Two Dimensional Image Mosaic

Figures 6A, 6B:
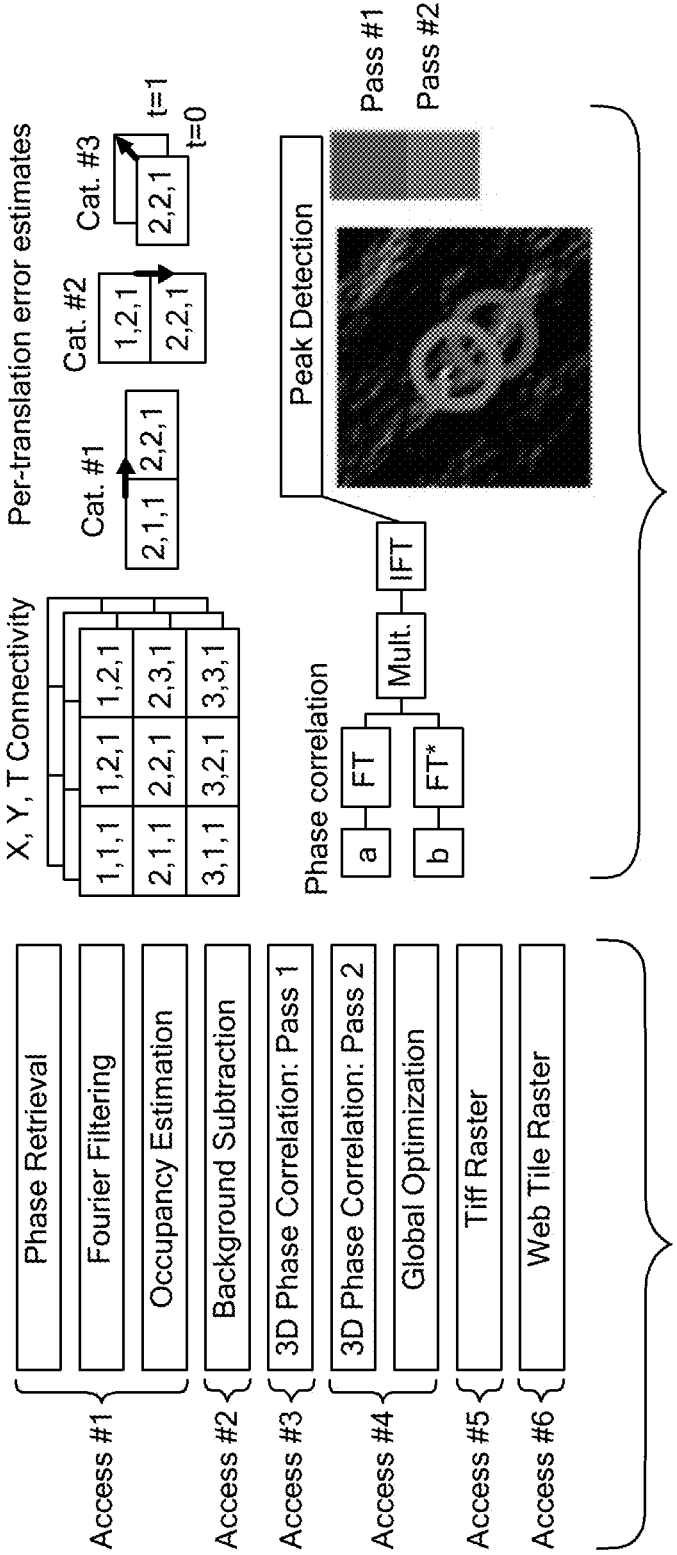
FIG. 6A shows a summary of the image alignment and registration algorithm, while FIG. 6B provides detailed diagrams of the phase correlation step, both in accordance with an embodiment of the present invention.

To assemble the time-lapse scans, an image alignment and registration algorithm is applied that is capable of efficiently handling very large FOV. FIG. 6Aa summarizes such an algorithm implemented in PyCUDA to overlap computation with disk access, which is typically the rate-limiting factor. The algorithm proceeds by calculating the GLIM image and performing background correction. Additionally, understanding that empty regions have zero gradients, we estimate the occupancy of each tile by summing the magnitude of the phase-difference images. The median phase value over the least occupied tiles is taken as a background measurement used to correct shared defects such as dust and scratches on the optics.

The phase correlation algorithm proceeds by generating a list of connections along the X, Y, and time axis. This list is then sorted to improve performance by ensuring that mosaic tiles are read sequentially and relieved from computationally expensive steps such as disk access and the Fourier transform. To align the images, given two tiles, $a(r_\perp)$ and $b(r_\perp)$, we find a displacement vector $r_{\perp n} \in \Re^2$, such that $a(r_\perp)=b(r_\perp-r_{\perp n})$. This vector is a maximizer of the correlation function between the two tiles, i.e., $r_{\perp n(a,b)}=\arg\max_{r_\perp}[(a\otimes b)(r_\perp)]$ in the formulation provided here by way of example. Here, the correlation function can be computed quickly using the Fast Fourier Transform (FFT) as $$(a\otimes b)(r_\perp)=F^{-1}\{F(a)F(b)^*\}(r_\perp).$$

Figures 8A, 8B:
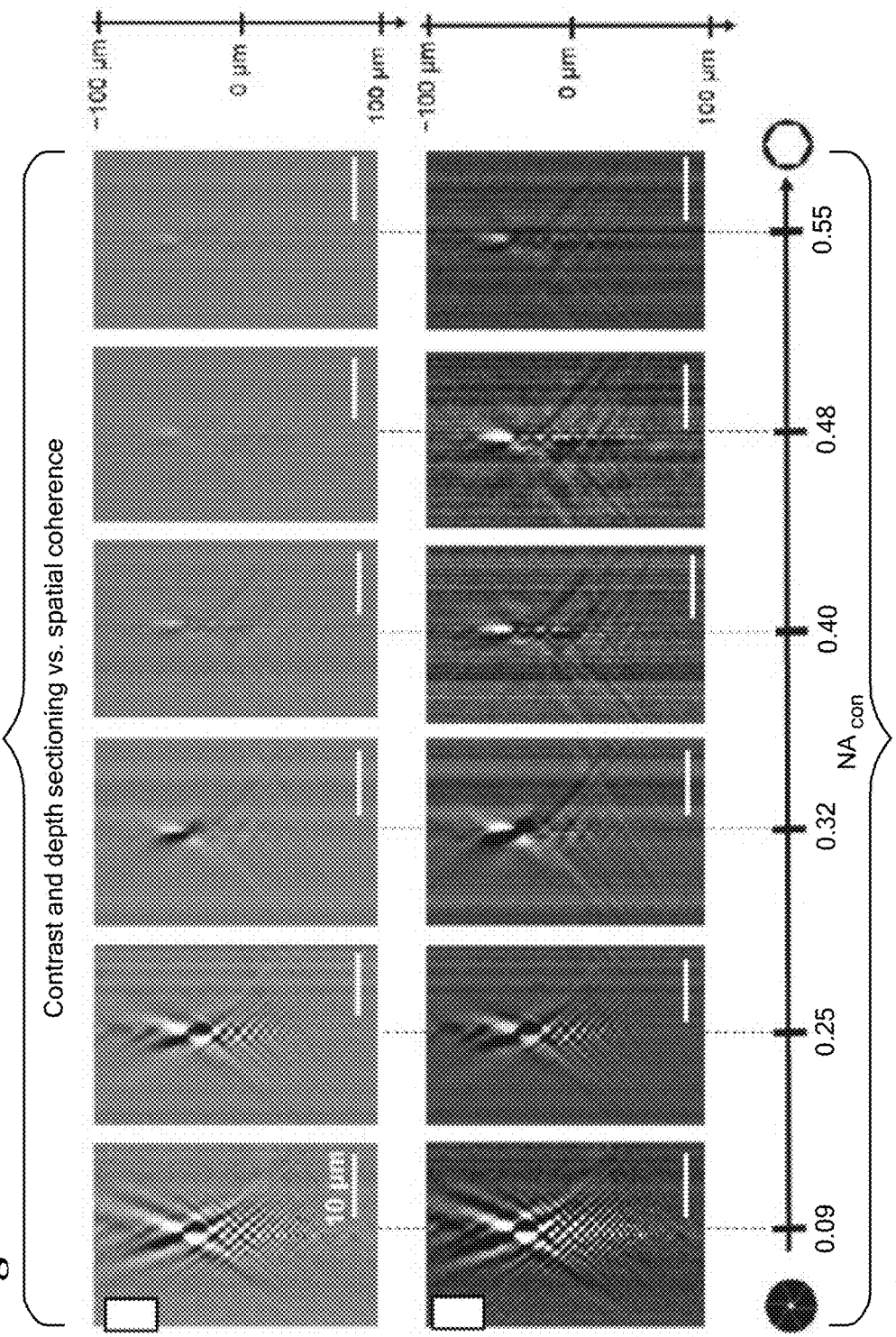
FIGS. 8A and 8B illustrate contrast and depth sectioning vs. spatial coherence in accordance with an embodiment of the present invention.

The correlation function $(a\otimes b)(r_\perp)$ may be masked with a searching window to refine dimensions of the searching area. To reduce the chance for secondary peaks, a two-pass peak detection may be implemented. In the first pass, a large search radius is used to gather the errors associated with each category of motion, as depicted in FIG. 8B, red radius. In the second pass, the expected tile location is augmented with these per-category error estimates and the search radius is narrowed.

After estimating the optimal transverse displacement, $r_{\perp n(a,b)}$, between every two neighboring tiles (a,b) using the phase correlation algorithm, an additional global optimization step is performed to find their best configuration of all tiles while taking into account the initial locations of the tiles, $p_o[k]$, which are provided by the microscope. Let $p^\dagger[k]$ be the optimal location of $k^{th}$ tile and $p^\dagger=\{p^\dagger[1], \ldots, p^\dagger[N]\}$ be the best configuration, i.e., location vector, of all the tiles. To obtain $p^\dagger$, the following objective function is minimized:

$$p^\dagger = \arg\min_p \sum_k \left\{ \sum_{j \in N(k)} \|(p_o[j] - p[k]) - r_{\perp n(j,k)}\|^2 \right\}.$$

Here, $N(k)$ is the set of all tiles that have connections with tile $k^{th}$. After solving for $p^\dagger$, it is used it to generate floating point .tiff files for quantitative analysis and rendered into the mipmap format used by Zoomify or TrakEM2 for easy access.

Using this procedure, zoomed-in images of the stitching results from all images in the whole FOV at different scales may be obtained.

Intracellular Mass Transport Calculation

The solution to the dispersion phase relation was computed directly on the phase gradient, $\nabla_x \phi$, which is possible because the it relates linearly to the dry mass density $\rho(r_\perp)$ More specifically, taking the two-dimensional Fourier transform of the phase gradient yields $$F[\nabla_x \phi](k_\perp) = k_x \phi(k_\perp) = \xi k_x \rho(k_\perp),$$

where $\xi$ is a constant, defined as $\xi = 2\pi\alpha/\lambda_o$ with $\lambda_o$ is central wavelength of the illumination and $\alpha \approx 0.2$ ml/g the refractive index increment. F is the two-dimensional Fourier transform operator. Also, for heuristic convenience, $\phi(k_\perp)$, $\rho(k_\perp)$ have been used to denote the two-dimensional Fourier transform of the phase and the dry mass density evaluated at the spatial frequency vector $k_\perp$, respectively. Ignoring spatial frequencies along the $k_x = 0$ line, the phase gradient $\nabla_x \phi$ can be used to compute the autocorrelation function $g(k_\perp, \tau)$ instead of the dry mass density $\rho$, thus:

$$g(k_\perp, \tau) = \frac{\langle \rho^*(k_\perp, t)\rho(k_\perp, t+\tau)\rangle_t}{\langle \rho^*(k_\perp, t)\rho(k_\perp, t)\rangle_t} = \frac{\langle F^*[\nabla_x \phi](k_\perp, t)F[\nabla_x \phi](k_\perp, t+\tau)\rangle_t}{\langle F^*[\nabla_x \phi](k_\perp, t)F[\nabla_x \phi](k_\perp, t)\rangle_t}\bigg|_{k_x \neq 0}.$$

Automatic Segmentation of Hela Cells from GLIM Filtered Data

Automatic segmentation is advantageous in obtaining high-throughput, consistent, objective metrics on the cells during their development cycle. In accordance with an automatic segmentation procedure, an input stack of raw GLIM data consists of three cells with one of them in mitosis. First, the input is thresholded, hole-filtered, and morphologically transformed with the opening and closing with a 3×3×3 structure element. These steps eliminate spurious background noise, reduce the surface roughness, fill out gaps due to internal structures of the cells, and most importantly, generate a 3D binary map where a value of 1 are assigned to voxels inside the cells, and 0, otherwise. Then, the watershed algorithm is used to produce separating barriers splitting the binary map into multiple regions corresponding to different cells. Details of the watershed algorithm may be found in Vincent et al., "*Watersheds in digital spaces: an efficient algorithm based on immersion simulations,*" IEEE Transactions on Pattern Analysis & Machine Intelligence, vol. 13, pp. 583-98 (1991), incorporated herein by reference. The watershed algorithm uses an inverted distance map and some seeds generated as local maxima of the distance map. Here, the distance map is a scalar field where the value at each voxel is 0 if its value of the binary map is 0. On the other hand, when the binary is 1, the value at the voxel corresponds to the closest distance between it and the nearest boundary voxel. Next, the separating barriers are subtracted from the binary map and labels are given to connecting volumes in the resulting map. Finally, regions with volume measurement smaller than 900 μm³ or 300,000 voxels, equivalently, are eliminated.

Dry Mass Estimation Using GLIM

Barer, "Interference microscopy and mass determination," *Nature*, vol. 169, pp. 366-67 (1952), incorporated herein by reference, showed that in two cases of serum albumin and serum globulin the following relation holds with good accuracy: $\alpha = \Delta n/C = [(n_p - n_s)/C]$, Here, $\alpha$ is the refractive index increment, C is the number of grams of dry protein per 100 ml, and $n_p$, $n_s$ are the refractive indices of the protein and the solvent, respectively. Note that this relation holds in the 3D settings where these quantities are functions of the 3D coordinate r. The quantity C is the mass density of dry protein, calculated as $(dm/dV)(r)$, where m is the total dry mass of the cell, and V is its volume. Therefore, $$m = \int_{r \in V} dm(r) = \int_{r \in V} \frac{\Delta n(r)dV(r)}{\alpha(r)} = \int_{r \in V} \frac{\Delta n(r)d^3r}{\alpha(r)}.$$

where the variation of $\alpha(r)$ is relatively small $\alpha \approx 0.18\text{-}0.21$ ml/g, with a common value of $\bar{\alpha} = 0.20$ ml/g. However, the accurate determination of volume V is very challenging. This obstacle hinders the prior equation from widespread use. A workaround was suggested by Barer by assuming that the refractive index is integrated along the axial dimension during imaging, i.e., $\Delta n(r) = \Delta n(r_\perp)$ to convert the foregoing equation into $$m = \int_{r_\perp \in S} \frac{\Delta n(r_\perp)h(r_\perp)d^2r_\perp}{\bar{\alpha}} = \int_{r_\perp \in S} \frac{\varphi(r_\perp)d^2r_\perp}{\bar{\alpha}\beta_o},$$

where $\varphi(r_\perp) = \beta_o \Delta n(r_\perp)h(r_\perp)$, and S the effective projected area of the cell. Unfortunately, this assumption is not applicable to optically thick sample.

The total dry mass may be derived directly, as now shown, given that V is accurately provided by GLIM. First, the foregoing mass equation may be cast in terms of the susceptibility using the following approximation, $\Delta n(r) \approx [(n_p^2(r) - n_s^2)/(2n_s)] = [\chi(r)/(2n_s)]$. This yields:

$$m = \frac{1}{2n_s \bar{\alpha}} \int_{r \in V} \chi(r) d^3r \approx \frac{\bar{\chi}V}{2n_s \bar{\alpha}}.$$

In the foregoing expression, the refractive index of the surrounding media $n_s$ can be approximated as 1.33. To obtain the average susceptibility $\bar{\chi} = (\int \chi(r)d^3r/V) \approx \tilde{\chi}^{(3)}$ ($k=0$), one may assume that the spatial spectrum of the object is preserved through time so that $\bar{\chi}$ can be estimated using the absolute value of the filtered data i.e. $\bar{\chi} = \gamma(\int |\chi_{hp}(r)|d^3r/V)$ up to constant $\gamma$. The relative dry mass can be estimated without knowing this constant.

Time-Lapse Measuring of Mass, Surface Area, Volume and Sphericity of Hela Cells

Combining various fields of view, several metrics may be obtained, in accordance with the present invention, over cells during their development cycles.

Figure 7A:
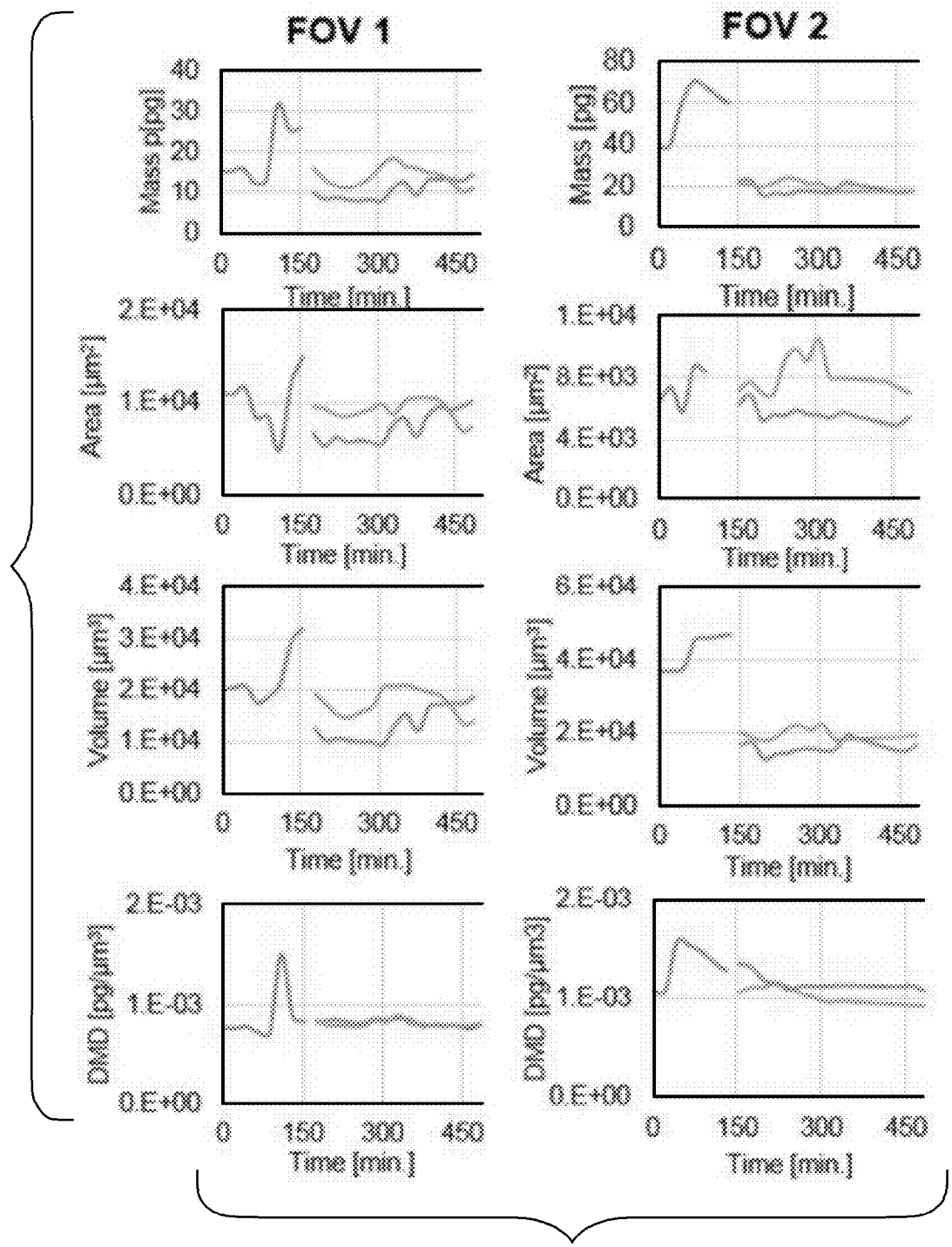
FIGS. 7A-7B plot results of cell time-lapse measurements using GLIM in accordance with an embodiment of the present invention.
Figure 7B:
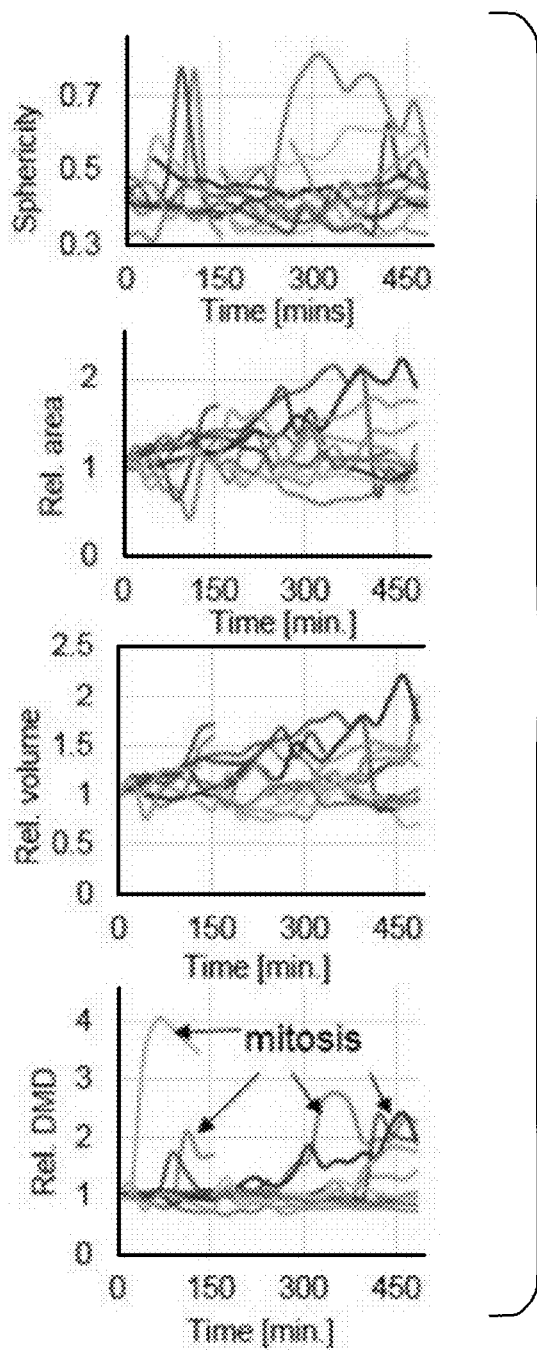

FIG. 7A shows time-lapse measurements for absolute total dry mass (m), surface area (A), volume (V) and dry mass density (DMD=m/V) for two different FOVs. Each FOV has one parent cell and two daughter cells. The filtered data are used for automatic segmentation and dry mass extraction using procedures outlined above. These relative quantities of these metrics are computed by dividing their absolute values to those at the first time point, t=0 minute and shown in FIG. 7B. We further display the sphericity (S), defined as $S=\pi^{1/3}(6V)^{2/3}/A$, over time. Here, relative metrics are shown, as obtained from 17 different cells randomly selected over all FOVs. Each curve corresponds to one individual cell. Our results show that, the total dry mass, volume, and surface area of all cells increase over the time during interphase. Meanwhile, the DMD is almost constant. However, when the cells enter mitosis, confirmed by maxima of the sphericity (FIG. 7B), the surface area and volume reduce since the cells ball up forming spheroids. This fact results in an increase of the dry mass density during mitosis.

Three Dimensional Image Formation in GLIM

As shown above, small values of $NA_{con}$ give a precise value of the phase gradient. The present discussion now focuses on the other regime, that of large $NA_{con}$, where the depth sectioning is best, thanks to the maximum angular coverage. Under the $1^{st}$ order Born approximation, two sample fields coming to the camera plane can be written as $$U_1(r)=U_i(r)-\beta_o^2\{[U_i\chi]\circledv_r g\}(r),$$

$$U_2(r)=U_i(r)-\beta_o^2\{[U_i\chi(r+\delta r)]\circledv_r g\}(r).$$

Here, g(r) is the propagation kernel, defined by the microscope's objective and given by $g(r)\approx iF_{k_\perp}^{-1}\{e^{iqz}\text{circ}[k_\perp/(\beta_o NA_o)]\}/(2\bar{n}\beta_o)$. Also, $\beta_o$ is the wavenumber in free-space. Next, $F_{k_\perp}^{-1}(.)$ is the inverse two-dimensional Fourier transform operator, and circ(x) is the rectangular function, defined as circ(x)=1 if x≤1 and 0, otherwise. $(k_\perp, q)$ is a 3D wavevector constrained by the dispersion relation as $q=\sqrt{\beta_o^2-k_\perp^2}$. Finally, "$\circledv_r$" is the three-dimensional convolution operator in the spatial domain and χ(r) is the susceptibility of the sample. Hence, the temporal cross-correlation function of the two fields, at zero delay, τ=0, becomes $$\gamma(r,\delta r) = \langle U_1(r)U_2^*(r)\rangle_t$$

$$= \Gamma_i(r,r;0) - \beta_o^2 \int \Gamma_i(r,r';0)\chi^*(r')g^*(r-r')d^3r' -$$

$$\beta_o^2 \int \Gamma_i(r'',r;0)\chi(r''-\hat{x}\delta x)g(r-r'')d^3r'',$$

where $\Gamma_i$ is the mutual intensity function of the illumination, which only depends on the coordinate difference under the statistically homogeneous assumption, namely, $\Gamma_i(r_1,r_2;0)=\Gamma_i(r_1-r_2)=\int S_c(k_\perp)e^{i[k_\perp(r_{1\perp}-r_{2\perp})+q(z_1-z_2)]}d^2k_\perp$. Here, $S_c$ is the aperture intensity of at the condenser aperture plane. Using this property of $\Gamma_i$, the preceding equation can be simplified to read:

$$\gamma(r,\delta r)=\Gamma_i(0;0)-\beta_o^2\{\chi\circledv_r[\Gamma_i g^*](r)+(\Gamma_i*g)(r-\hat{x}\delta x)]\}.$$

Assuming a non-absorbing object with a real χ, with a uniform unit-amplitude intensity distribution at the condenser aperture, with $g(r)\approx iF_{k_\perp}^{-1}\{e^{iqz}\text{circ}[k_\perp/(\beta_o NA_o)]\}/(2\bar{n}\beta_o)$, and $\Gamma_i(r)\approx F_{k_\perp}^{-1}\{e^{iqz}\text{circ}[k_\perp/(\beta_o NA_c)]\}$, it is clear that the function $(\Gamma_i g^*)$ are purely imaginary. Therefore, $(\Gamma_i*g)=-(\Gamma_i g^*)=\text{Im}(\Gamma_i*g)$. As a result, $$\nabla_x\phi(r)=\arg[\gamma(r;\delta r)]/\delta x=\beta_o^2 \arctan\{\chi\circledv_r Im[(\mu_t g^*)(r)-(\mu_t g^*)(r-\hat{x}\delta x)]\}/\delta x\approx\beta_o^2(\chi\circledv_r Im[(\mu_t g^*)(r)-(\mu_t g^*)(r-\hat{x}\delta x)])/\delta x,$$

where $\mu_t(r)=\Gamma_i(r;0)/\Gamma_i(0;0)$, the complex degree of spatial coherence of the incident field. FIG. 13a show a $k_x$-$k_z$ cross-section of the imaginary part of the computed transfer function (TF) of the GLIM system for different values of the $NA_{con}$. This TF is obtained by 3D Fourier transforming the Point Spread Function (PSF), $h(r)=Im[(\mu_t g^*)(r-\hat{x}\delta x)]$.

Since the PSF is odd, the TF is purely imaginary. The absolute value of the TF vanishes at $k_x=0$, since a constant signal in the x-direction is filtered out by the gradient operator. Therefore, there is a missing area around $k_x=0$ not covered by the TF. This region of missing frequencies is similar to the "missing cone" problem known in diffraction tomography. Resolving this area requires rotating the sample or using additional priors, e.g., smoothness constraint. Larger $NA_{con}$ reduces the size of the missing cone, allowing the system to record more frequency components. The larger the $NA_{con}$, the more transverse frequencies are captured by the TF. More importantly, around $NA_{con}/2$ more $k_z$ frequency bandwidth is captured with $NA_{con}=0.55$ compared to those with $NA_{con}=0.09$, which essentially means that depth sectioning improves when $NA_{con}$ increases. The axial elongation of the PSF decreases for larger $NA_{con}$. The improvement in depth sectioning for increasing $NA_{con}$ also reduces the ringing effects since less non-specific information from one z-plane is propagated into neighboring planes. Any diffraction ringing phenomenon is suppressed when $NA_{con}$ increases.

FIG. 8A shows x-z cross-sections of GLIM measurements of 4.5-μm beads vs. $NA_{con}$. The microscope scanned the beads in the axial direction over an interval of [−100 μm, 100 μm] with a step size of Δz=0.05 μm. Here, the same dynamic range is applied to all images to study the change in contrast vs. $NA_{con}$. FIG. 8B has all images contrast normalized to assess depth sectioning better. Clearly, reducing the coherence of the illumination by increasing $NA_{con}$ improves the depth sectioning of the GLIM measurement at the cost of contrast reduction. Such improvement in depth sectioning is crucial when measuring optically thick samples.

Filtering Method to Improve Depth Sectioning of GLIM

In order to improve the optical sectioning, low-frequency components are removed from the data using a high-pass filter. Steps of our methods are summarized in FIG. 9. First, the shading artifact is removed using Wiener deconvolution. Since $h(r)=Im[(\mu_t g^*)(r)(\mu_t g^*)(r-\hat{x}\delta x)]$, the transfer function is $\tilde{h}(k)=2i\sin(k_x\delta x/2)F\{Im(\mu_t g^*)\}(k)$. The Wiener deconvolution result of the susceptibility can be obtained in the frequency domain as $$\tilde{\chi}_{weiner}(k) = \frac{-2i\sin(k_x\delta x/2)\delta x}{\beta_o^2[4\sin^2(k_x\delta x/2)+\varepsilon]}F[\nabla_x\phi](k),$$

where ε is a small number, set to be $10^{-4}$ to avoid amplifying frequency components with small signal-to-noise ratios (SNRs). To further improve the axial resolution, it is necessary to significantly suppress the low-frequency components in $\chi_{Weiner}(r)$. This may be achieved by applying high-pass filtering in the x-y domain for each recorded z-image. In each dimension (x and y), a convolution with a finite-length impulse response (FIR), chosen as $h_{hp}(x)=[0.25, -0.25, 0, -0.25, 0.25]$, is applied. As a result of this high pass filtering, $\chi_{hp}(r)$ has most of the small transverse frequencies suppressed and, as a result, yields very good depth sectioning. Note that this high-pass filtering step can be combined with the Wiener deconvolution step since both are linear operators. Also, there is no need to perform any z-processing in our proposed method. This allows the processing to be done effectively by interlacing with image acquisition.

Figures 9A, 9B, 9C:
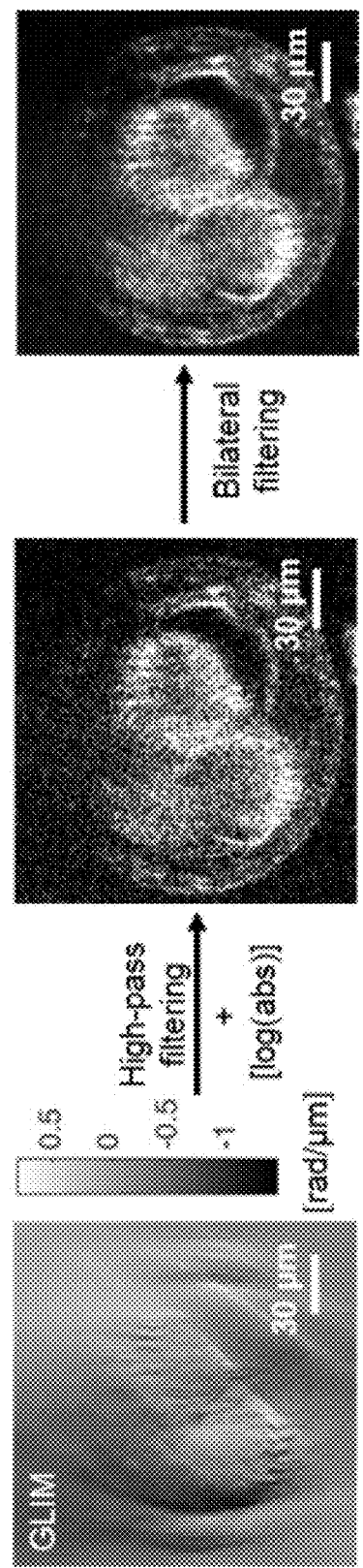
FIGS. 9A-9C illustrate a filtering scheme to improve depth sectioning in accordance with an embodiment of the present invention. The raw GLIM data is filtered to suppress the low-frequency components before being bilateral filtering to reduce the high-frequency oscillations due to the missing low-frequency and recover structures of the object.

After filtering, a log [abs(.)] transform may be applied to increase the contrast of the retained high-frequency components in the output image. To further suppress the background noise, only signals with amplitude within [−5.0, 0.0] are retained. Finally, to smooth the image and remove high-frequency oscillations in the image due to missing small transverse frequencies, bilateral filtering may be applied to the transformed results, as described by Tomasi et al., "*Bilateral Filtering for Gray and Color Images,*" in *Sixth International Conference on Computer Vision* (*IEEE*), pp. 839-846 (1998), which is incorporated herein by reference. FIGS. 9A-9C summarize these steps with illustration on the impacts of the processing. Clearly, the output of the post-processing has better depth sectioning compared to the input image. Different structures and materials, which are not visible in the raw input, appear nicely in the output.

The embodiments of the invention described above are intended to be merely exemplary; numerous variations and modifications will be apparent to those skilled in the art. All such variations and modifications are intended to be within the scope of the present invention as defined in any appended claims.

We claim:

1. A method for quantitative optical phase imaging of a sample characterized by a surface, the method comprising:
   a. generating a first and a second replica field of an image field, each of the image field and the first and second replica fields characterized by a respective optical phase, the second replica field cross-polarized and shifted in a shift direction transverse to a normal to the surface of the sample by a transverse offset;
   b. spatially Fourier transforming the first and second replica fields;
   c. retarding the second replica field by four successive phase shifts;
   d. inverse Fourier transforming the first and second replica fields;
   e. passing the first and second replica field through an analyzer polarizer and superposing the first and second replica fields on a detector array to create four successive detector signals; and
   f. solving the four successive detector signals to derive a gradient of the optical phase of the image field.

2. A method in accordance with claim 1, wherein retarding the second replica field includes employing a spatial light modulator.

3. A method in accordance with claim 1, wherein the four successive phase shifts are integral multiples of π/2.

4. A method in accordance with claim 1, wherein the transverse offset is smaller than a diffraction spot characterizing an optical system whereby the first and second replica fields are obtained.

5. A method in accordance with claim 1, further comprising integrating the gradient of the optical phase to obtain an image of the optical phase of the image field.

6. A method in accordance with claim 1, wherein solving the four successive detector signals includes deriving a mutual intensity function between the first and second replica fields.

7. A system for quantitative optical phase imaging of a sample characterized by a surface, the system comprising:
   a. a microscope for generating a first and a second replica field of an image field, each of the image field and the first and second replica fields characterized by an optical phase, the second replica field cross-polarized and shifted in a shift direction transverse to a normal to the surface of the sample by a transverse offset;
   b. a first lens for spatially Fourier transforming the first and second replica fields;
   c. a spatial light modulator for retarding the second replica field by four successive phase shifts;
   d. a second lens for inverse Fourier transforming the first and second replica fields;
   e. an analyzer polarizer aligned at 45° with respect to respective polarizations of the first and second replica fields;
   f. a detector array for creating four successive detector signals; and
   g. a processor for solving the four successive detector signals to derive a gradient of the optical phase of the image field.

8. A system in accordance with claim 7, wherein the microscope includes a Wollaston prism for separating the first and second replica fields.

9. A module for receiving a first and a second replica field of an image field of a sample characterized by a surface and for quantitative optical phase imaging of the sample, wherein each of the image field and the first and second replica fields is characterized by an optical phase, the second replica field cross-polarized and shifted in a shift direction transverse to a normal to the surface of the sample by a transverse offset,
   the module comprising:
   a. a first lens for spatially Fourier transforming the first and second replica fields;
   b. a spatial light modulator for retarding the second replica field by four successive phase shifts;
   c. a second lens for inverse Fourier transforming the first and second replica fields; and
   d. an analyzer polarizer aligned at 45° with respect to respective polarizations of the first and second replica fields.

10. A method for assessing viability of an embryo, the method comprising:
   a. generating a first and a second replica field of an image field containing the embryo, each of the image field and the first and second replica fields characterized by a respective optical phase, the second replica field cross-polarized and shifted in a shift direction transverse to a normal to the surface of the sample by a transverse offset;
   b. spatially Fourier transforming the first and second replica fields;
   c. retarding the second replica field by four successive phase shifts;
   d. inverse Fourier transforming the first and second replica fields;
   e. passing the first and second replica field through an analyzer polarizer and superposing the first and second replica fields on a detector array to create four successive detector signals;
   f. solving the four successive detector signals to derive a gradient of the optical phase of the image field; and
   g. applying morphokinetic criteria to a function of the gradient of the optical phase to characterize embryo viability.

* * * * *